United States Patent
Konatham et al.

(10) Patent No.: US 12,180,868 B1
(45) Date of Patent: Dec. 31, 2024

(54) ADJUSTABLE VALVE ASSEMBLY AND STRATEGY FOR CONTROLLING A FLUID SYSTEM

(71) Applicant: Caterpillar Inc., Peoria, IL (US)

(72) Inventors: Phani Chandar Reddy Konatham, Peoria, IL (US); Ye Tian, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/489,307

(22) Filed: Oct. 18, 2023

(51) Int. Cl.
| | |
|---|---|
| *F01M 5/00* | (2006.01) |
| *F16K 31/00* | (2006.01) |
| *F01M 1/02* | (2006.01) |
| *F01M 11/02* | (2006.01) |

(52) U.S. Cl.
CPC ........... *F01M 5/007* (2013.01); *F16K 31/002* (2013.01); *F01M 1/02* (2013.01); *F01M 11/02* (2013.01)

(58) Field of Classification Search
CPC ............ F01M 5/007; F01M 1/02; F01M 1/10; F01M 5/002; F01M 11/0004; F01M 11/02; F16K 31/002
See application file for complete search history.

(56) References Cited

U.S. PATENT DOCUMENTS

| | | | |
|---|---|---|---|
| 3,817,450 A * | 6/1974 | Mischke | G05D 23/1333 236/34.5 |
| 5,819,692 A | 10/1998 | Schafer | |
| 9,200,713 B2 * | 12/2015 | Neelakantan | F16K 31/002 |
| 9,896,979 B2 * | 2/2018 | Noonchester | F01M 5/021 |
| 10,054,962 B2 | 8/2018 | Yajima | |
| 2017/0167330 A1 * | 6/2017 | Lee | F01M 5/007 |

FOREIGN PATENT DOCUMENTS

| | | |
|---|---|---|
| CN | 103696824 B | 11/2016 |
| EP | 2163797 B1 | 7/2014 |
| KR | 101501147 B1 | 3/2015 |
| KR | 101684214 B1 | 12/2016 |
| KR | 101776422 B1 | 9/2017 |

* cited by examiner

*Primary Examiner* — Syed O Hasan
(74) *Attorney, Agent, or Firm* — Brannon Sowers & Cracraft PC (57) ABSTRACT

A fluid system includes a housing having a valve bore, a fluid supply conduit, and a valve positioned in the valve bore and defining a valve axis. The valve has a first outer sealing surface, a second outer sealing surface, and an inner surface forming a fluid passage extending between a fluid inlet fluidly connected to the fluid supply conduit, and at least one fluid outlet spaced axially from the first outer sealing surface and the second outer sealing surface. A thermoactuator is coupled to the valve and exposed to a flow of fluid from the fluid supply conduit. The working fluid in the fluid system may include engine oil.

17 Claims, 5 Drawing Sheets

ADJUSTABLE VALVE ASSEMBLY AND STRATEGY FOR CONTROLLING A FLUID SYSTEM

TECHNICAL FIELD

The present disclosure relates generally to a fluid system and strategy for controlling fluid connections therein, and more particularly to a fluid valve assembly adjustable among different connection states responsive to fluid temperature.

BACKGROUND

Internal combustion engines typically include cooling systems to regulate the temperature of the engine itself and the engine oil as well as other fluids. Combustion of a mixture of air and fuel causes engine oil to become hot, and as components including pistons, crankshaft, etc. experience friction during operation of the engine, they generate additional heat as well as debris. The heat produced from combustion and friction is conducted through the engine components and to exposed surfaces in contact with the engine oil as well as other fluids such as engine coolant. Engine oil is circulated, absorbing heat from the engine's metal surfaces and carries away the heat to be dissipated while simultaneously ensuring the moving parts of the engine remain lubricated.

Typically some active system is employed for cooling of the engine oil to prevent the oil from overheating which leads to oil breaking down over time and becoming less effective at lubricating the necessary moving components of the engine. Engine oil filters are also well-known and widely used for capturing debris in the engine oil. In some engines, notably compression-ignition diesel engines, one or more valves may be present in order to vary a flow path of the engine oil to regulate its temperature, so as to prevent engine overheating or to promote warming up. Cooling bypass valves can be used to vary the oil flow path amongst components such as an oil cooler and an oil filter. Engine cooling systems facilitate heat exchange and are generally mounted in areas that can receive airflow and/or a pumped heat exchange fluid such as engine coolant. When an engine is operated for some time and/or at higher engine loads, the heat may be sufficient that engine oil cooling is imperative. Failure to regulate engine oil temperature can lead to stress and may cause failure of various components. On the other hand, when an engine is first started the oil is cold and additional cooling can be undesired and negatively impact performance.

One known oil cooler with a valve device is set forth in European Patent No. EP2163797B1 to Mahle International. In the Mahle International patent, an oil cooler with a valve device includes a cylinder and a translatable piston inside of a guide sleeve. The oil cooler is characterized as being reliable and repair friendly. While there may be practical uses for the disclosed oil cooler, there is always room for improvement and development of alternative strategies.

SUMMARY

In one aspect a fluid valve assembly includes a valve body defining a valve axis extending between a first axial valve body end and a second axial valve body end. The valve body includes a fluid inlet in the first axial valve body end, and a fluid outlet located axially between the first axial valve body end and the second axial valve body end. The valve body further includes a first outer sealing surface, a second outer sealing surface, and an inner surface forming a fluid passage extending between the oil inlet and the oil outlet. A thermoactuator is coupled to one of the first axial valve body end or the second axial valve body end.

In another aspect a fluid system includes a housing having a valve bore, a first fluid feed conduit, and a second fluid feed conduit formed therein, and a fluid supply conduit. The fluid system further includes a valve positioned in the valve bore and defining a valve axis, the valve including a first outer sealing surface, a second outer sealing surface, and forming a fluid passage extending between a fluid inlet fluidly connected to the fluid supply conduit, and at least one fluid outlet. The valve is movable between a first service location in the valve bore where the fluid passage fluidly connects the fluid supply conduit to at least one of the first fluid feed conduit and the second fluid feed conduit in a first fluid connection pattern, and a second service location in the valve bore where the fluid passage fluidly connects the fluid supply conduit to at least one of the first fluid feed conduit and the second fluid feed conduit in a second fluid connection pattern. The fluid system still further includes a thermoactuator coupled to the valve and exposed to a flow of fluid from the fluid supply conduit.

In yet another aspect a method of operating a fluid system includes feeding a fluid from a supply conduit into a passage in a valve positioned at a first service location in a valve bore within a housing. The method further includes feeding the fluid from the passage into a first feed conduit fluidly connected to the passage at the first service location, exchanging heat between the fluid and a thermoactuator coupled to the valve body, and operating the thermoactuator based on the exchanging heat to adjust the valve to a second service location in the valve bore. The method still further includes feeding the fluid from the passage into a second feed conduit fluidly connected to the passage at the second service location.

DETAILED DESCRIPTION

Figure 1:
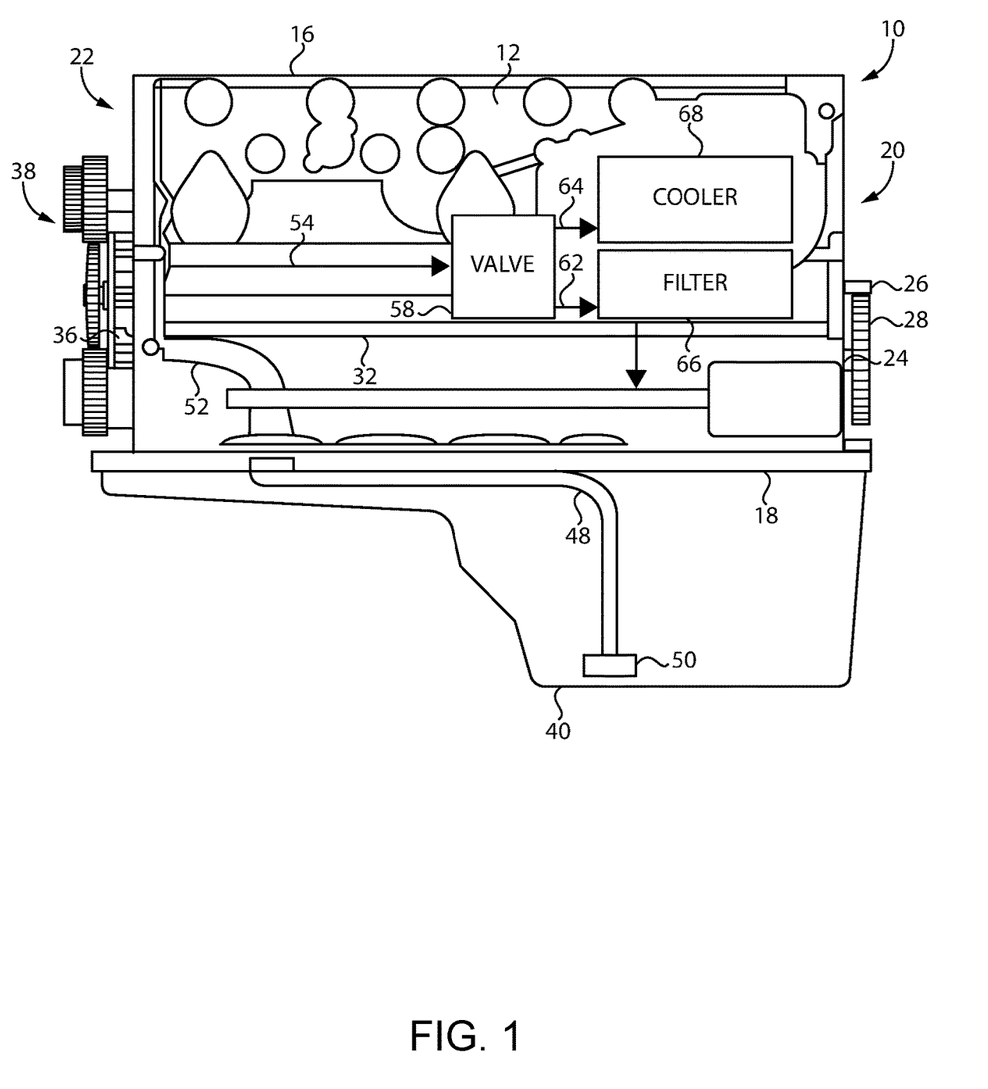
FIG. 1 is a diagrammatic view of an engine and associated components including an oil system, according to one embodiment.
Figure 2:
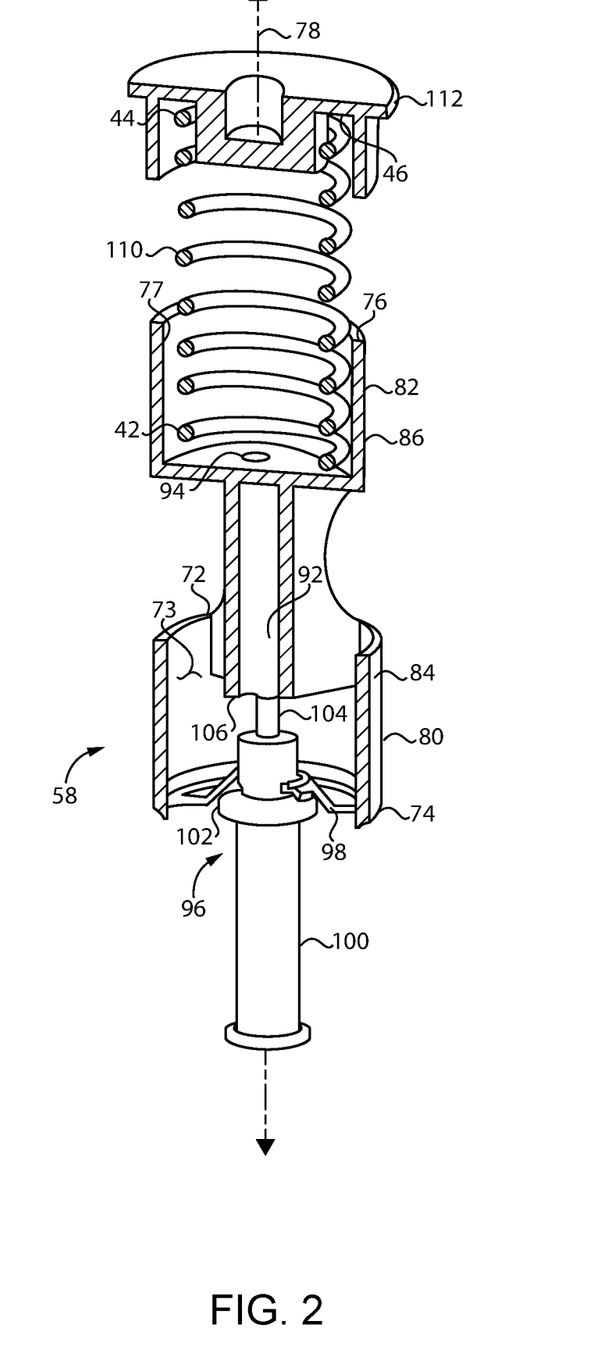
FIG. 2 is a sectioned view of a valve assembly, according to one embodiment.

Referring to FIG. 1, illustrated is an internal combustion engine 10, according to one embodiment. Internal combustion engine 10 includes a cylinder block 12, typically formed as a one-piece casting generally made of cast iron or aluminum, although the present disclosure is not thereby limited. Cylinder block 12 includes a plurality of cylinders (not shown) extending between a top deck surface 16 and a bottom block surface 18, and longitudinally positioned between a front block end 20 and a back block end 22. Cylinder number and/or arrangement could vary, and in-line, V-pattern, opposed, and potentially still other configurations are within the scope of the present disclosure. Engine may include a compression-ignition diesel engine, although again the present disclosure is not thereby limited.

Engine 10 also includes a crankshaft 24 which rotates in a conventional manner based on the reciprocating motion of pistons (not shown) within the respective cylinders. A flywheel 28 within a flywheel housing may be mounted to crankshaft 24 adjacent front block end 20, also in a generally conventional manner. Engine 10 may also include a back gear train, a main drive gear, and various other components and systems not specifically illustrated but which will be familiar to those skilled in the art.

Engine 10 further includes an engine housing 32 having fluid conduits to facilitate engine fluid circulation between and/or among engine subsystems. One particular subsystem is an engine oil system 34 which circulates oil to provide lubrication, remove contaminants, cool oil, and protect components. Engine oil system 34 includes an oil pump 36 mounted adjacent to a front geartrain 38 in a generally conventional manner. Oil pump 36 is operated by crankshaft 24, to draw and to some extent pressurize oil from an oil supply 40 located adjacent bottom block surface 18. Oil pump 36 then delivers the oil throughout engine 10 to moving components, again generally in a conventional manner.

Oil system 34 also includes an oil pan 41 containing an oil supply 40 coupled to bottom block surface 18. Oil pan 41 and oil supply 40 are referred to interchangeably herein at times. As depicted, oil pump 36 is coupled to engine geartrain 38, but in other examples oil pump 36 may be resident in oil supply 40 or mounted to an underside of cylinder block 12, for example, and electrically powered. Submerged within oil supply 40 is an oil line 48 extending between oil supply 40, specifically an oil supply filter 50, and an oil suction conduit 52. Oil suction conduit 52 may extend through cylinder block 12, from oil pump 36 to bottom block surface 18 and fluidly connects to an oil line 48. An oil supply conduit 54 extends through cylinder block 12 from oil pump 36 to a valve bore 56 having an oil valve assembly 58 therein. Oil valve assembly 58 is supported in engine housing 32 and moveable between two, and typically among three, service locations where valve assembly 58 permits and restricts oil flow amongst oil passages as influenced by a temperature of the oil, as further discussed herein. Engine housing 32 additionally includes a first oil feed conduit 62, a second oil feed conduit 64, and a valve bore 56 connected to each. As shown, first oil feed conduit 62 feeds into an oil filter 66, and second oil feed conduit 64 feeds into an oil cooler 68. First oil feed conduit 62, second oil feed conduit 64, and oil supply conduit 54 will be described in further detail subsequently. Any of oil supply conduit 54, first oil feed conduit 62, second oil conduit 64, and other fluid conduits discussed herein may include cast-in passages, or external hoses or the like.

While the present description discusses the use of oil in an oil system, it should be appreciated that other fluids and other fluid systems are within the scope of the present disclosure. An example is the use of hydraulic fluid in a hydraulic system, transmission fluid in a transmission system, coolant within a cooling system, and still others. Accordingly, description and discussion herein of "oil" or an "oil valve" or similar terms, for example, are illustrative only, and can be understood to refer generically to a fluid.

Referring now also to FIGS. 2-5, engine housing 32 may further include therein valve bore 56 typically cast-in and machined to specifications. Valve bore 56 is generally cylindrical and extends between top deck surface 16 and bottom block surface 18. A metallic valve or valve body 72 (hereinafter "valve body 72") having a first axial valve body end 74 and a second axial valve body end 76 is disposed within valve bore 56. Valve body 72 defines a valve axis 78 extending between first axial valve body end 74 and second axial valve body end 76. Valve body 72 may be translated in an axial direction along valve axis 78 among service locations, as further discussed herein. Adjacent first axial valve body end 74 is a first outer sealing surface 80 which may be configured to selectively restrict oil flow to first oil feed conduit 62. Additionally, located adjacent second axial valve body end 76 is a second outer sealing surface 82 which may be configured to selectively restrict oil flow to second oil feed conduit 64. First outer sealing surface 80 and second outer sealing surface 82 may include a first outer peripheral surface 80 and a second outer peripheral surface 86, respectively, extending circumferentially around valve axis 78.

First axial valve body end 74 forms an oil inlet 88 fluidly connected to oil supply conduit 54 and is intended to allow the entry of oil into valve assembly 58. An oil outlet 90 may be located axially between first axial valve body end 74 and second axial valve body end 76. Oil outlet 90 may open in a radially outward direction and is configured to allow oil to exit valve assembly 58. An inner surface 92 of valve body 72 may form an oil passage 73 that extends between oil inlet 88 and oil outlet 90. Fluidly connected to the subject oil passage 73 is an oil hole 94 formed within the second axial valve body end 76. Oil hole 94 permits displacement of oil as valve body 72 translates along valve axis 78. An oil passage might be formed on an outside surface of valve body 72 in some embodiments, and still considered to be formed by an inner surface of valve body 72. Likewise an inlet and/or an outlet to an oil passage as contemplated could be formed at least in part in an outer surface of valve body 72 and need not extend through an interior of valve body 72. Thus, inner surface 92 is merely "inner" relative to some "outer" surface of valve body 72, not necessarily being an inside surface of valve body 72 although such may provide a practical implementation strategy.

As shown, valve body 72 is also coupled to a thermoactuator 96, attached via a bracket 98 in the illustrated embodiment, having an actuator body 100, a flange 102, and a piston or piston rod 104. While the present description discusses the use of a bracket 98 configured to couple thermoactuator 96 to valve body 72, it should be appreciated that a "bracket" could have a variety of forms including a strut, a wall, or a variety of other structures. Still other mechanisms and strategies for coupling thermoactuator 96 to valve body 72 may be used without limitation. In still other instances, thermoactuator 96 might be supported separately from valve body 72 and only physically connected by way of contact of piston rod 104 therewith. Still other coupling strategies include having a surface on an exterior of the valve body 72 which is contacted by piston rod 104, an end cap 112 attached to valve body 72 and contacted by piston rod 104, or something altogether different.

During operating thermoactuator in service, heat from the engine oil is exchanged with thermoactuator 96. As thermoactuator 96 warms, typically warming a thermally expansive fluid therein, piston rod 104 is caused to move valve body 72 from a first service location to a second service location, and potentially to a plurality of service locations more than two in number as further discussed herein. As oil cools, which may be the result of engine 10 being shut down, piston rod 104 retracts, returning valve body 72 from a second service location to a first service location. Actuator body 100 is disposed within valve bore 56 and serves as the housing for piston rod 104. Alternatively, thermoactuator 96 might be outside of the valve bore 56, provided the thermoactuator 96 is still in heat exchange communication with the fluid conveyed through the valve bore 56. When heat is applied to thermoactuator 96, fluid in actuator body 100 expands causing piston rod 104 to move relative to actuator body 100 to vary an axial position of valve body 72 within valve bore 56. It should be emphasized that in the illustrated embodiment, thermoactuator 96 is disposed within valve bore 56 and located radially inward of both first outer sealing surface 80 and second outer sealing surface 82, but could be oriented in other suitable arrangements in other embodiments. Piston rod 104 is configured to abut a load surface 106, on one of first axial valve body end 74 or second axial valve body end 76. Load surface 106 may be positioned radially inward of first sealing surface 80. In one embodiment, thermoactuator 96 may be a wax actuator 108, containing within actuator body 100 a suitable wax, that expands and contracts in response to temperature changes to enable linear movement of piston rod 104 along valve axis 78. Suitable thermoactuators 96, such as wax actuators, are readily commercially available.

Valve assembly 58 may also include a spring biaser 110 having a first spring biaser end 42 and a second spring biaser end 44 and an end cap 112 disposed within valve bore 56. Spring biaser 110 is coupled to second axial valve body end 76 and biases valve body 72 in opposition to a force provided by thermoactuator 96 due to increased oil temperature. As engine 10 cools, leading to a decrease in the engine oil temperature, spring biaser 110 moves valve body 72 back to the first service location as the wax within actuator body 100 cools and contracts. Valve body 72 may be movable between a first service location in valve bore 56 where fluid passage 73 fluidly connects supply conduit 54 to at least one of first fluid feed conduit 62 and second fluid feed conduit 64 in a first fluid connection pattern, and a second service location in valve bore 56 where supply conduit 54 is fluidly connected to at least one of first fluid feed conduit 62 and second fluid feed conduit in a second fluid connection pattern. In the first fluid connection pattern, supply conduit 54 is typically only fluidly connected to first fluid feed conduit 54 so as to feed all of the oil to filter 66 for filtering and return to the engine. In the second fluid connection pattern, supply conduit 54 is typically only fluidly connected to second fluid feed conduit 54 so as to feed all of the oil to cooler 68 for cooling, and then return to engine 10 by way of filter 66. Valve body 72 may be movable to a third service location fluidly connecting supply conduit 54 simultaneously to both first fluid feed conduit 62 and second fluid feed conduit 64, as further discussed herein.

Second axial valve body end 76 may include a recess 77 configured to receive first spring biaser end 42, and end cap 112 may include a recess 46 that receives second spring biaser end 44. End cap 112 may be adjacent cylinder block 12 and within cast-in valve bore 56. The present description discusses an end cap 112 located within valve bore 56, but it should be appreciated that the function of end cap 112 is generally to position and support spring biaser 110. An end cap may alternatively be located outside of the valve bore 56 or in some instances, there may be no end cap. Spring biaser 110 may include a coil spring. As illustrated, thermoactuator 96 may be exposed to and in fluid communication with a flow of oil from oil supply conduit 54 and is configured to move valve body 72 from a first service location to a second service location. As also illustrated, first oil feed conduit 62 may convey oil to oil filter 66, and second oil feed conduit 64 convey oil to oil cooler 68.

In the course of engine operation, oil begins at an initial starting temperature and gradually warms as engine 10 use continues. In response to the gradual increase of engine temperature, thermoactuator 96 changes the service location of valve body 72 from a first service location to a second service location generally apace with the change in the temperature of the oil. When operating at higher engine loads or after prolonged operation, valve body 72 could remain in the second service location until the engine 10 is shut down. For example, a second service location could be a standard operating location where all of the engine oil is cooled before being filtered and returned to the engine. In other instances, a service location where all of the engine oil is cooled could be a service location assumed by valve body 72 only when oil temperatures have risen past some threshold and full cooling efficacy is needed. Valve assembly 58 could thus be employed as an oil overheating protection device in addition to or instead of an oil temperature regulation device.

Figure 3:
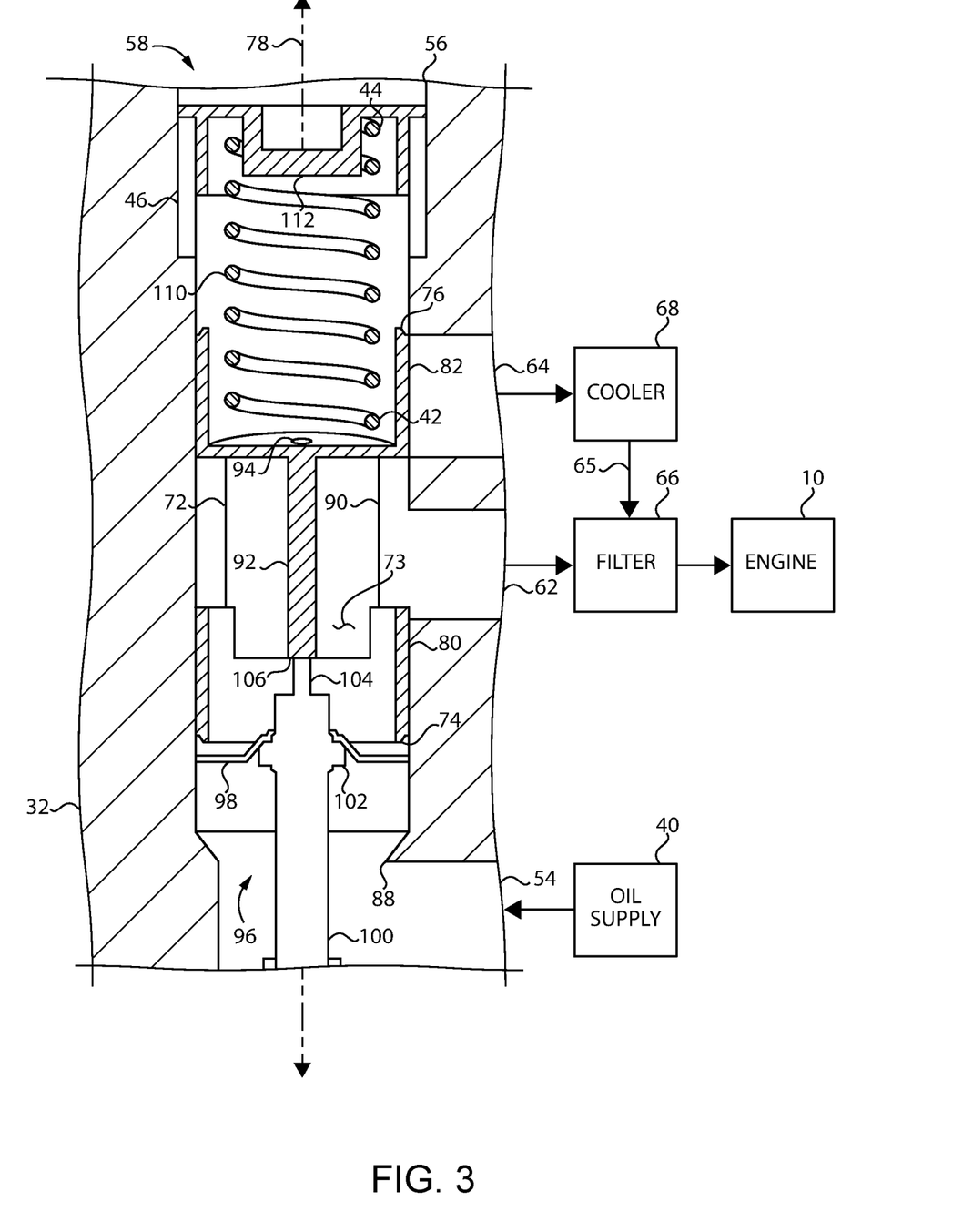
FIG. 3 is another sectioned view of a valve assembly at a service location in an engine, according to one embodiment.

Referring also now to FIG. 3, during initial operation of engine 10, oil at an initial starting temperature enters valve assembly 58 via oil inlet 88 and exchanges heat with thermoactuator 96. While oil at an initial starting temperature enters, valve position is at the first service location within valve bore 56 and second outer sealing surface 82 restricts oil feeding into cooler 68 while permitting oil feeding to filter 66. In this instance, there may be no need at all for oil cooling, and any cooling of the oil might be disfavored. Subsequently, oil is conveyed to other engine components.

Figure 4:
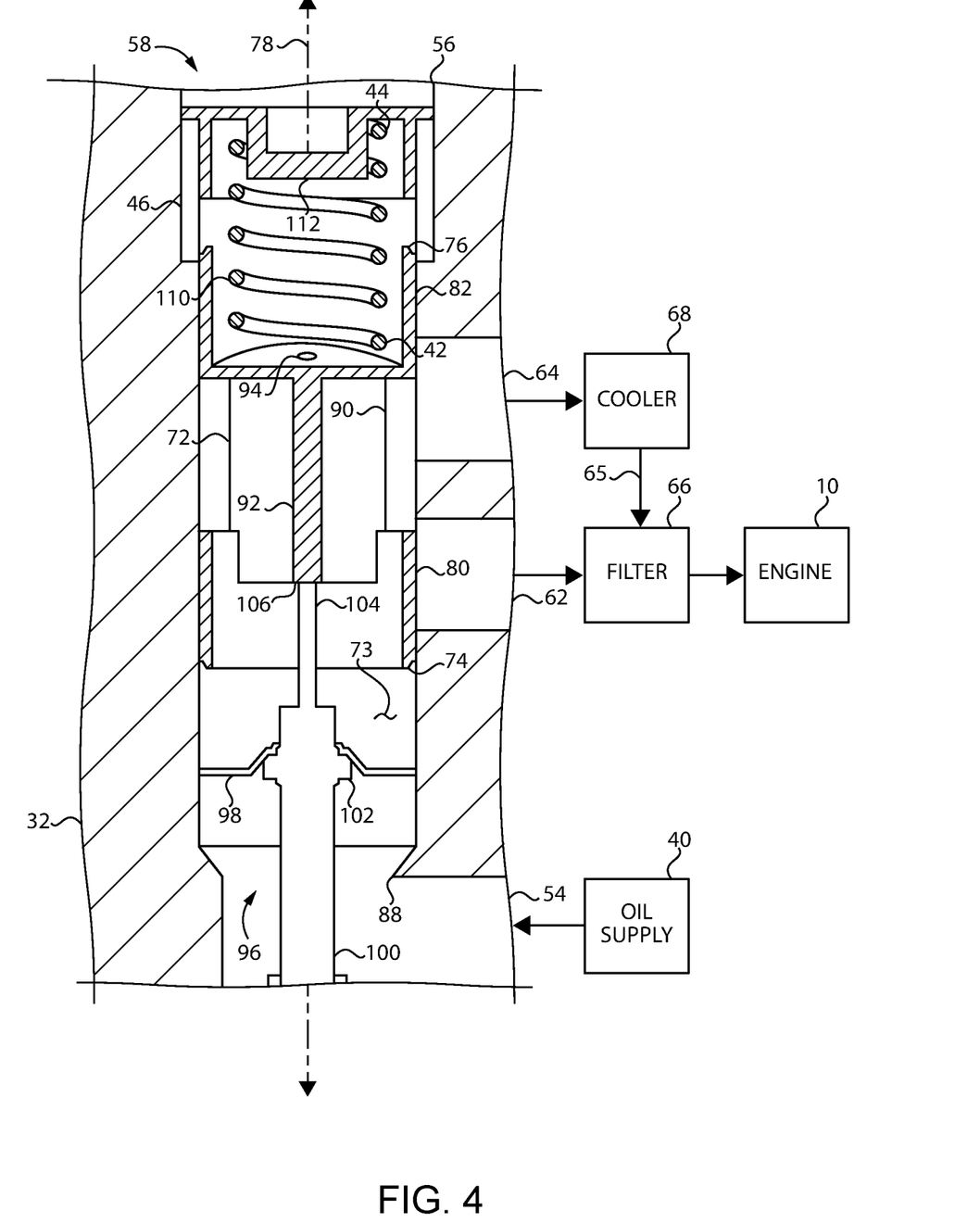
FIG. 4 is another sectioned view of a valve assembly at another service location in an engine, according to one embodiment.

Referring now also to FIG. 4, as engine 10 remains in operation, the oil becomes moderately heated and valve body 72 has been axially translated within valve bore 56. As moderately heated oil feeds into valve assembly 58, heat is exchanged between the oil and the thermoactuator 96 resulting in the piston rod 104 axially extending in a direction toward the biasing spring 110. As piston rod 104 moves valve body 72 in comparable course, compressing spring biaser 110, oil is permitted to feed from first oil feed conduit 62 to filter 66 and second oil feed conduit 64 to cooler 68 simultaneously. Due to the translation of valve body 72, first outer sealing surface 80 and second outer sealing surface 82 have moved axially now allowing a portion of the oil to first oil feed conduit 62 and a portion of the oil to second oil feed conduit 64. Moderately heated oil fed into cooler 68 via second oil feed conduit 64 is then cooled and fed to filter 66 via a third feed conduit 65 to be conveyed to other engine 10 components.

Figure 5:
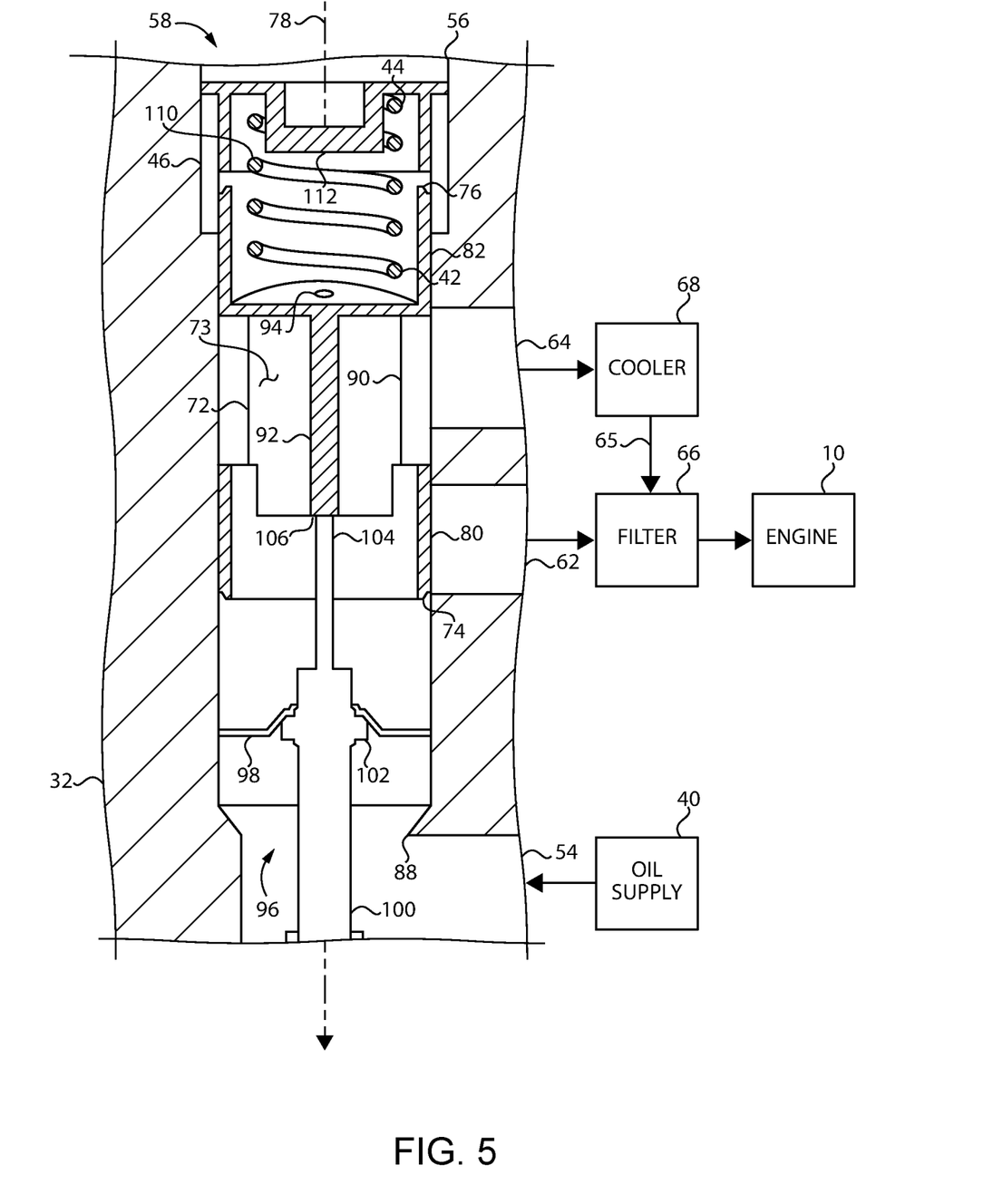
FIG. 5 is yet another sectioned view of a fluid valve assembly at yet another service location in an engine, according to one embodiment.

Referring now also to FIG. 5, as engine temperature continues increasing, oil may become further heated. As oil continues to feed into valve assembly 58 and exchanges heat with thermoactuator 96, piston rod 104 is prompted to extend further toward spring biaser 110. As piston rod 104 continues to extend toward spring biaser 110, oil feed is gradually cut off to filter 66 while eventually only permitting oil feeding to cooler 68. Translation of valve body 72 further compresses spring biaser 110, while first outer sealing surface 80 blocks first oil feed conduit 62 restricting oil feeding to filter 66. Oil conveyed to cooler 68 is cooled to return the oil to a temperature close to optimal for continued circulation and heat exchange with other components of engine 10. In any circumstance, when engine 10 is shut down, spring biaser 110 gradually extends as engine 10 oil temperature lowers, returning valve body 72 to the first service location. FIG. 3 may be understood as depicting valve body 72 at a first service location, FIG. 4 depicting valve body 72 at a third service location, and FIG. 5 depicting valve body 72 at a second service location. The terms "first," "second," and "third" are used herein only for descriptive convenience, however. In other embodiments, a valve member 72 might have only two service locations, or more than three service locations depending upon system design and operating objectives.

INDUSTRIAL APPLICABILITY

Referring to the drawings generally, it will be recalled that during operation of engine 10, crankshaft 24 rotates based on the reciprocation of pistons. Rotation of crankshaft 24 operates oil pump 36 to draw and pressurize oil from oil supply 40. As oil pump 36 draws oil, oil flows from oil suction conduit 52 through oil pump 36 to oil supply conduit 54 so as to feed oil to valve assembly 58. From valve assembly 58, with valve 72 at a suitable service location oil flows to filter 66 where debris is removed and the oil is recirculated throughout engine 10.

As the engine warms so warms the oil, and valve assembly 58 is operated as discussed herein to move valve body 72 generally in accordance with oil temperature to begin feeding oil to both filter 66 and cooler 68. As oil is eventually warmed further, valve assembly 58 can be operated such that all of the engine oil is fed to cooler 68. Oil from cooler 68 is conveyed through filter 66, and thenceforth throughout engine 10. As discussed herein, embodiments are contemplated where oil temperature is not expected to rise sufficiently to trigger a condition where all of the oil is conveyed through cooler 68 except in cases of potential overheating. In other instances, it may be expected that the oil temperature will eventually rise sufficiently during the normal course of operation to position valve assembly 58 such that all oil goes to cooler 68 before passing through filter 66. Depending upon operating conditions and machine application, valve assembly 58 might be adjusted among the service locations frequently, regulating oil temperature so as to remain within an optimal temperature range. In other instances, valve assembly 58 might gradually move from a starting service location when the engine is started to a second service location and remain at the second service location until the engine is shut down, after which valve assembly 58 moves back to its starting service location.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A valve assembly comprising:
    a valve body defining a valve axis extending between a first axial valve body end and a second axial valve body end, the valve body having formed therein a fluid inlet in the first axial valve body end, and a fluid outlet located axially between the first axial valve body end and the second axial valve body end;
    the valve body further including a first outer sealing surface, a second outer sealing surface, and an inner surface forming a fluid passage extending between the fluid inlet and the fluid outlet;
    the first axial valve body end including a terminal axial end, the inner surface extending to the terminal axial end and the fluid passage opening in the terminal axial end; and
    a thermoactuator coupled to one of the first axial valve body end or the second axial valve body end;
    wherein the thermoactuator is coupled to the first axial valve body end, and further comprising a biasing spring coupled to the second axial valve body end; and
    wherein the valve assembly further includes at least a portion of an engine housing, and the valve body is within the at least a portion of an engine housing so as to convey engine oil between the fluid inlet and the fluid outlet.

2. The valve assembly of claim 1 wherein the thermoactuator includes a wax actuator.

3. The valve assembly of claim 1 wherein the second axial valve body end includes a valve recess receiving a first spring biaser end of the biasing spring, and further comprising an end cap receiving a second spring biaser end of the biasing spring.

4. The valve assembly of claim 1 wherein the first sealing surface and the second sealing surface include, respectively, a first outer peripheral surface and a second outer peripheral surface, extending circumferentially around the valve axis.

5. The valve assembly of claim 4 wherein the fluid outlet is located axially between the first sealing surface and the second sealing surface and opens in a radially outward direction.

6. The valve assembly of claim 1 wherein a fluid hole is formed in the second axial body end and is fluidly connected to the fluid passage.

7. The valve assembly of claim 1 further comprising a bracket coupling the thermoactuator to the valve body.

8. The valve assembly of claim 7 wherein the thermoactuator abuts a load surface of the valve body that is located axially between the first axial valve body end and the second axial valve body end.

9. A fluid system comprising:
    a housing having a valve bore, a first fluid feed conduit, and a second fluid feed conduit formed therein;
    a fluid supply pan attached to the housing;
    a pump supported on the housing outside of the fluid supply pan;
    a suction conduit formed in the housing and fluidly connecting between the fluid supply pan and the pump;
    a fluid supply conduit formed in the housing and fluidly connecting between the pump and the valve bore;
    a valve positioned in the valve bore and defining a valve axis, the valve including a first outer sealing surface, a second outer sealing surface, and forming a fluid passage extending between a fluid inlet fluidly connected to the fluid supply conduit, and at least one fluid outlet;
    the valve is movable between a first service location in the valve bore where the fluid passage fluidly connects the fluid supply conduit to at least one of the first fluid feed conduit and the second fluid feed conduit in a first fluid connection pattern, and a second service location in the valve bore where the fluid passage fluidly connects the fluid supply conduit to at least one of the first fluid feed conduit and the second fluid feed conduit in a second fluid connection pattern; and a thermoactuator coupled to the valve and exposed to a flow of engine oil from the fluid supply conduit;

wherein the housing includes an engine housing; and wherein the thermoactuator includes a linear wax actuator having a piston movable relative to the actuator body to move the valve between the first service location and the second service location.

10. The fluid system of claim 9 wherein in the first fluid connection pattern the fluid supply conduit is fluidly connected to the first fluid feed conduit but not the second fluid feed conduit, and in the second fluid connection pattern the fluid supply conduit is fluidly connected to the second fluid feed conduit but not the second fluid feed conduit.

11. The fluid system of claim 9 wherein the valve is movable to a third service location in the valve bore where the fluid passage fluidly connects the fluid supply conduit to both the first fluid feed conduit and the second fluid feed conduit.

12. The fluid system of claim 9 further comprising a filter fluidly connected to the first fluid feed conduit, and a cooler fluidly connected to the second fluid feed conduit.

13. The fluid system of claim 9 wherein the thermoactuator includes a linear wax actuator having a piston movable relative to the actuator body to move the valve between the first service location and the second service location.

14. The fluid system of claim 13 wherein the thermoactuator is coupled to the first axial valve body end, and further comprising a biasing spring coupled to the second axial valve body end and biasing the valve in opposition to the piston.

15. A method of operating an engine system comprising:

feeding engine oil from a fluid supply conduit into a passage in a valve positioned at a first service location in a valve bore in an engine housing attached to an oil pan, the valve defining a valve axis extending between a first axial end including a terminal axial end and a second axial end, a fluid outlet located axially between the first axial end and the second axial end, a first outer sealing surface, a second outer sealing surface, and an inner surface forming the passage, and extending to the terminal axial end;

feeding the engine oil from the passage into a first feed conduit fluidly connected to the passage at the first service location;

exchanging heat between the engine oil and a thermoactuator coupled to the first axial end of the valve;

operating the thermoactuator based on the exchanging heat to adjust the valve to a second service location in the valve bore, in opposition to a biasing force of a biasing spring coupled to the second axial end; and feeding the engine oil from the passage into a second feed conduit fluidly connected to the passage at the second service location.

16. The method of claim 15 further comprising feeding the engine oil from the first feed conduit to a filter, and feeding the engine oil from the second feed conduit to a cooler.

17. The method of claim 16 further comprising operating the thermoactuator to adjust the valve to a third service location in the valve bore, and feeding the engine oil to both the first feed conduit and the second feed conduit fluidly connected to the passage at the third service location.

* * * * *